Patented Jan. 14, 1930

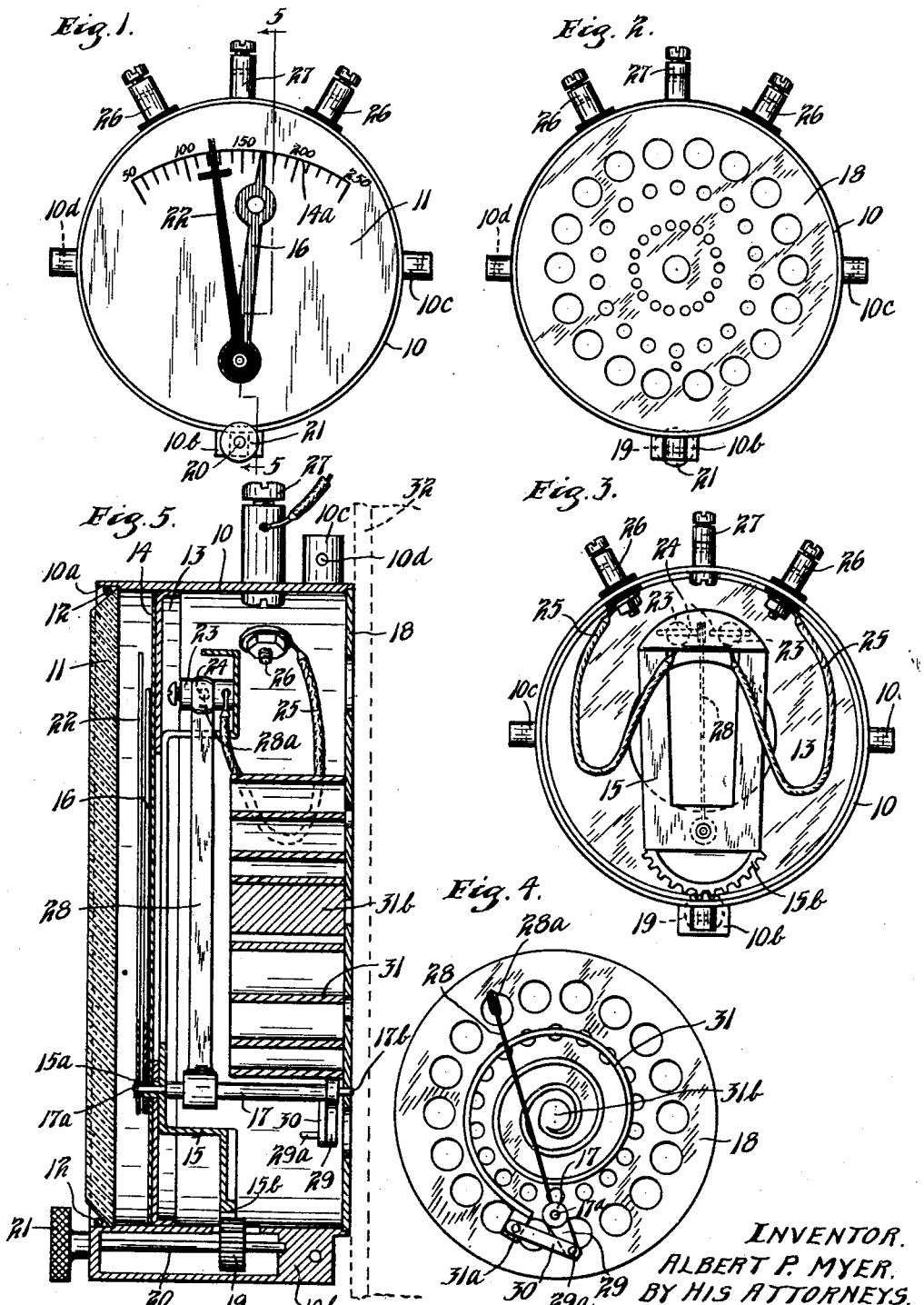
Jan. 14, 1930. A. P. MYER 1,743,229
HEAT INDICATOR AND REGULATOR
Filed Oct. 20, 1927
INVENTOR.
ALBERT P. MYER.
BY HIS ATTORNEYS.

1,743,229

UNITED STATES PATENT OFFICE

ALBERT P. MYER, OF MINNEAPOLIS, MINNESOTA, ASSIGNOR TO SIMPLEX HEAT REGULATOR COMPANY, OF MINNEAPOLIS, MINNESOTA, A CORPORATION OF MINNESOTA

HEAT INDICATOR AND REGULATOR

Application filed October 20, 1927. Serial No. 227,426.

This invention relates to a thermostatic heat indicator, and while the device is capable of many applications, it particularly is designed for use with a furnace or other heater, to indicate the temperature of the heated medium such as steam, water or air.

It is an object of this invention to provide a heat indicator having an indicating means which may be set at some desired temperature and having another indicator for indicating the temperature of the heated medium, together with means by which an electrical circuit may be closed when said latter indicator indicates the temperature at which said first mentioned indicator is set.

It is another object of the invention to provide a heat indicating device having a dial with heat graduations thereon, a hand co-operating with said dial and adapted to be set to indicate a certain temperature, a thermostat, and another hand co-operating with said graduations controlled by said thermostat, together with means also moved by said thermostat to engage contacts and close an electrical circuit when said hands indicate the same temperature.

It is more specifically an object of the invention to provide a heat indicating device comprising a casing having a revoluble shaft therein, a member movable on said shaft carrying a pair of contacts connected to binding posts on said casing, a dial having heat indicating graduations thereon, a hand carried by said member adapted to be set to indicate a certain temperature, another hand secured to said shaft co-operating with said graduations to indicate the temperature of the heated medium, and a contact arm also secured to said shaft having a portion disposed between said contacts, together with means disposed outside of said casing for turning said first mentioned member and hand.

These and other objects and advantages of the invention will be fully set forth in the following description made in connection with the accompanying drawings, in which like reference characters refer to similar parts throughout the several views and in which:—

Fig. 1 is a view in front elevation of the device;

Fig. 2 is a view in rear elevation thereof;

Fig. 3 is a view of the interior of the device with certain parts removed;

Fig. 4 is a view of the inside of the rear cover of the device with the parts carried thereby; and Fig. 5 is a view taken on line 5—5 of Fig 1, as shown on an enlarged scale.

Referring to the drawings, a device is shown comprising a casing 10 of cylindrical shape, having a rabbeted portion 10$^a$ adjacent one edge forming a shoulder against which is seated a circular transparent plate or crystal 11, said crystal having an outwardly beveled edge. A spring wire 12 which is of approximately circular form is wedged within the edge of said rabbeted portion and engages the crystal 11, to hold the same in place. The casing 10 has secured therein a short distance in the rear of the crystal 11, an annular diaphragm 13 having a cylindrical flange at its outer edge fitting within casing 10. A dial plate 14 is disposed against the diaphragm 13 at the front thereof and has adjacent its top graduations 14$^a$ adapted to indicate degrees of heat. While these graduations may be variously designated, in the embodiment of the invention illustrated they are shown as indicating a range of from 50 to 250 degrees. A member 15 made of sheet material, preferably metal, is provided, being reversely bent as shown in Figs. 3 and 5, and having a projecting hub portion 15$^a$ fitting in and extending through an aperture in the diaphragm 13 and dial 14. Said hub 15$^a$ has secured thereon at its outer end outside of and closely adjacent dial 14, a hand 16. The hub 15$^a$ has projecting therethrough the reduced front portion 17$^a$ of a shaft 17 which also has a reduced portion 17$^b$ at its other end which is journaled in a cover plate 18 fitted within a rabbeted portion in the rear edge of the casing 10. As shown in Figs. 2 and 4, the plate 18 is provided with a plurality of circular rows of holes, the holes in the respective rows decreasing in diameter toward the center of said plate. The member 15 is thus freely movable on portion 17$^a$ of shaft 17 and said member has an arcuate tooth portion 15$^b$ at its lower edge with which meshes a pinion 19 carried on the shaft 20 which is journaled in a lug 10$^b$ upon the bottom of the casing 10, said lug being recessed to receive shaft 20 and pinion 19 and said casing having an aperture in its bottom through which pinion 19 extends. In practice the lug 10$^b$ is preferably soldered or welded to the casing 10. The shaft 20 has an operating knurled knob 21 at its front end disposed without casing 10. It will be seen that member 15 is thus movable or oscillatable on the portion 17$^a$ of shaft 17. The member 15 at its other end has a rearwardly offset portion having secured thereto a pair of spaced binding posts 23 having secured therein and projecting therefrom towards each other, contact members or points 24. Conductors 25 are connected to the posts 23 and are connected at their other ends to circumferentially spaced binding posts 26 secured to and insulated from casing 10, said binding posts 26 having portions disposed without the casing 10 and projecting therefrom, adapted to receive and hold other conductors. Another binding post 27 is secured to casing 10 between the binding posts 26, said post 27 being in electrical contact with casing 10. Said shaft has secured thereto at the front end of portion 17$^a$ a hand 22, the hands, 16 and 22 both co-operating with the graduations 14$^a$ and having their free ends moving adjacent thereto. The shaft 17 has secured thereto an arm 28 which projects upwardly therefrom and has a slightly thickened head 28$^a$ at its free end which is disposed between the contacts 24 and adapted at times to engage with one of said contacts. Said arm 28 is made of very thin flexible and resilient material. The shaft 17 has secured thereto adjacent the plate 18 an arm 29 having a projecting pin 29$^a$ extending inwardly from its free end. A link 30 is pivotally connected to the pin 29$^a$ and also pivotally connected at its other end to a projection 31$^a$ formed on a thermostat member 31. While the thermostat member 31 may be made of various shapes, in the embodiment of the invention illustrated it is shown as a spiral spring of plate material having a stud 31$^b$ at its center secured to cover plate 18. The casing 10 is also shown as provided with circumferentially spaced lugs 10$^c$ projecting radially therefrom, illustrated as having apertures 10$^b$ extending diametrically therethrough, which lugs may receive attaching means for the device. Said device will usually be attached by means (not shown) adjacent a wall or partition 32 of a furnace or other member which contains a heated medium, said wall 32 being indicated in dotted lines in Fig. 5.

In operation the device will as stated be disposed adjacent a furnace or other object having a heating medium therein. The knob 21 will be operated and the member 15 will thus be turned on shaft 17 to a certain position in the casing. At the same time, hand 16 will be turned and will be set at a certain indication of temperature on the graduations 14$^a$. When the member 15 is moved, one of the contacts 24 will engage the head 28$^a$ of the arm 28 and this arm will be bent or flexed. The thermostat coil 31 will expand and unwind, or contract with variations in temperature, depending on whether the temperature is rising or falling, and this contraction or expansion will move lug 31$^a$ and link 30 so that shaft 17 will be turned. When the temperature rises to the point at which the hand 16 is seat, the head 28$^a$ will move out of engagement with the contact 24 and will move into engagement with the other contact 24. This engagement with the latter contact 24 will close an electrical circuit which may be traced from one of the binding posts 26, conductor 25, contact 24, arm 28, shaft 17, cover plate 18 and casing 10, to the binding post 27. This circuit may be used to start a half-revolution or other motor which will regulate the dampers of the furnace or otherwise control the member having the heated medium therein. It will thus be seen that the device not only indicates the temperature of the heated medium, but also indicates another temperature and acts when the latter temperature is reached to close an electrical circuit. It will be seen that the cover plate 18 can be readily removed as the same is merely pressed into place and held therein by friction. As shown in Fig. 4, this plate carries the members 17, 29, 30 and 31 as well as arm 28. Before the cover plate can be removed, the crystal 11 must be removed and hands 16 and 22 lifted from shaft 17 and hub 15$^a$. When cover plate 18 and the parts carried thereby are removed the casing appears as shown in Fig. 3.

From the above description it is seen that applicant has provided a very simple and efficient thermostatic heat indicator and regulator. The parts of the device are quite few and simple and the adjustments are easily and quickly made. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A thermostatic heat indicator and regulator having in combination, a casing, a dial having graduations thereon indicating temperatures, a shaft journaled in said casing, a member journaled on said shaft carrying a hand cooperating with said graduations, a pair of spaced contacts carried by said member, a thermostatic coil mounted in said casing fixedly secured at its center, an articulated connection between the free end of said coil and said shaft, a contact arm carried by said shaft having its end portion disposed between said contacts, a hand carried by said shaft and adapted to cooperate with said graduations and means disposed without the casing for turning said member about said shaft.

2. A thermostatic heat indicator and regulator having in combination, a casing, a dial plate secured in said casing having graduations at one portion thereof, a plate-like member at the inner side of said dial plate having a cylindrical projection journaled in said dial plate at a point spaced from said graduations, a hand mounted on said cylindrical projection and cooperating with said graduations, a pair of spaced contacts carried by said plate-like member, a rear cover plate for said casing, a shaft journaled in said cover plate and in said projection, a hand carried by said shaft at the front of said dial plate and cooperating with said graduations, a contact arm carried by said shaft at the rear of said dial plate and having its end disposed between said contacts, a thermostatic coil carried by said rear plate, an articulated connection between said coil and said shaft and means disposed at the front side of said casing for swinging said plate-like member about said shaft.

3. A thermostatic heat indicator and regulator having in combination, a casing, a dial plate in the front portion of said casing having graduations adjacent the top thereof, a member in the rear of said dial plate having a projection journaled therein, a hand carried by said projection at the front of said dial plate and cooperating with the graduations thereon, a shaft journaled in said casing and projection, a hand secured to said shaft in front of said first mentioned hand and also cooperating with said graduations, a pair of spaced contacts carried by said member, a contact arm carried by said shaft, having one end disposed between said contacts, a thermostatic member in said casing for rotating said shaft upon changes in temperature and means at the front of the casing for moving said member.

In testimony whereof I affix my signature.

ALBERT P. MYER.